United States Patent [19]

Prikryl

[11] Patent Number: 4,843,603
[45] Date of Patent: Jun. 27, 1989

[54] CONCENTRIC PHOTODETECTOR ARRANGEMENT FOR FOCUSING AND TRACKING

[75] Inventor: Ivan Prikryl, Colorado Springs, Colo.

[73] Assignee: Optotech, Inc., Colorado Springs, Colo.

[21] Appl. No.: 166,679

[22] Filed: Mar. 11, 1988

[51] Int. Cl.⁴ .............................................. G11B 7/00
[52] U.S. Cl. .................................... 369/45; 369/46; 250/201
[58] Field of Search ............................. 369/43–47; 250/201, 201 DF; 358/342

[56] References Cited

U.S. PATENT DOCUMENTS

| | | | |
|---|---|---|---|
| 3,454,772 | 7/1969 | Vitt, Jr. et al. | 250/204 |
| 3,596,101 | 7/1971 | Someya et al. | 250/204 |
| 3,634,689 | 1/1972 | Ejiri | 250/201 |
| 3,721,827 | 3/1973 | Reinheimer | 250/201 |
| 3,757,124 | 9/1973 | Kaestner | 250/201 |
| 3,876,841 | 4/1975 | Kramer et al. | 179/100.3 |
| 3,890,499 | 6/1975 | Lippel | 250/201 |
| 3,974,327 | 8/1976 | Van Dijk | 178/6.6 R |
| 3,997,715 | 12/1976 | Elliott | 178/6.6 DD |
| 4,016,415 | 4/1977 | O'Meara | 250/201 |
| 4,060,725 | 11/1977 | Hoshika | 250/227 |
| 4,065,786 | 12/1977 | Stewart | 358/128 |
| 4,152,586 | 5/1979 | Elliott et al. | 250/201 |
| 4,357,533 | 11/1982 | Winslow | 369/45 X |
| 4,425,636 | 1/1984 | Musha et al. | 369/44 |
| 4,462,095 | 7/1984 | Chen | 369/44 |
| 4,464,567 | 8/1984 | Reilly et al. | 369/45 X |
| 4,504,937 | 3/1985 | Yonezawa et al. | 369/44 |
| 4,541,084 | 9/1985 | Oku et al. | 369/45 |
| 4,571,715 | 2/1986 | Kato et al. | 369/45 |
| 4,612,437 | 9/1986 | Ohsato | 250/201 |
| 4,625,303 | 11/1986 | Shikama et al. | 369/45 |

OTHER PUBLICATIONS

A. Frosch et al., *U.B.M. Technical Disclosure Bulletin*, "Optical Surface Microtopography Measurement and/or Automatic Focussing", vol. 15, No. 2 (Jul. 1972) pp. 504, 505.

Manabu Yamamoto et al., *Applied Optics*, "Optical Pregroove Dimensions: Design Considerations", Nov. 15, 1986, vol. 25, pp. 4031–4034.

H. Ukita et al., "MALS Head for Optical Recording", Technical Digest Conference, re lasers and electro-optics, May 18, 1983.

*Primary Examiner*—Robert L. Richardson
*Attorney, Agent, or Firm*—Kinney & Lange

[57] ABSTRACT

An optical data storage system includes a laser which is focused on an optical disk by an objective lens. A tracking actuator and a focus actuator move the objective lens about a tracking axis and focus axis respectively. The tracking and focus actuators respond to signals provided by a focus and tracking detector. The focus and tracking detector is formed by four photodetectors which are electrically isolated from one another. The third and fourth photodetectors are disposed about the outer peripheries of the first and second photodetectors, respectively, about an axis. Each photodetector emits an electrical signal representative of the radiation detected thereon.

30 Claims, 5 Drawing Sheets

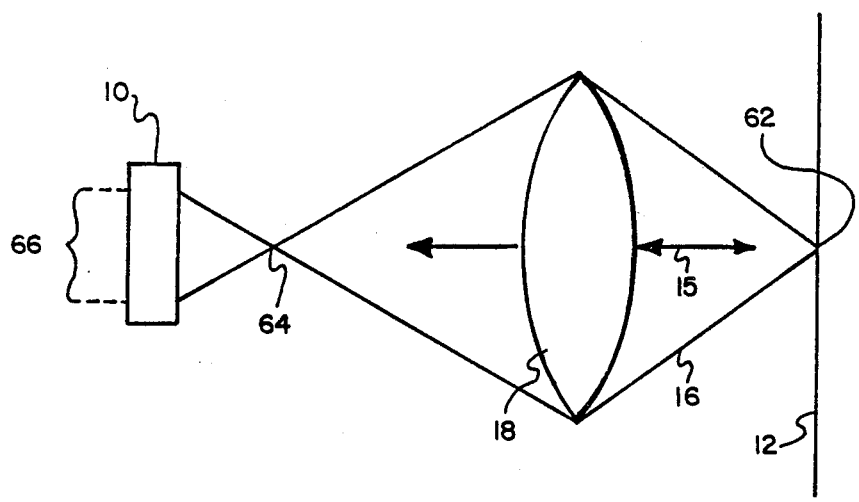
*Fig. 3(a)* In Focus
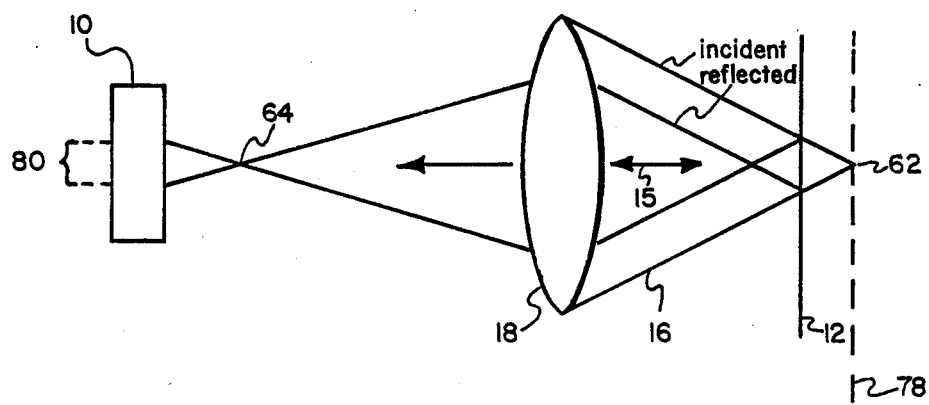
*Fig. 3(b)* Out of Focus
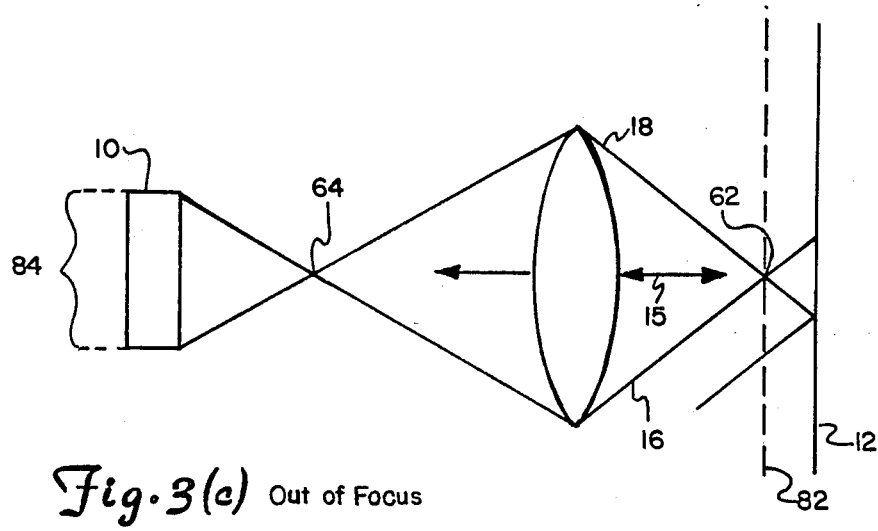
*Fig. 3(c)* Out of Focus

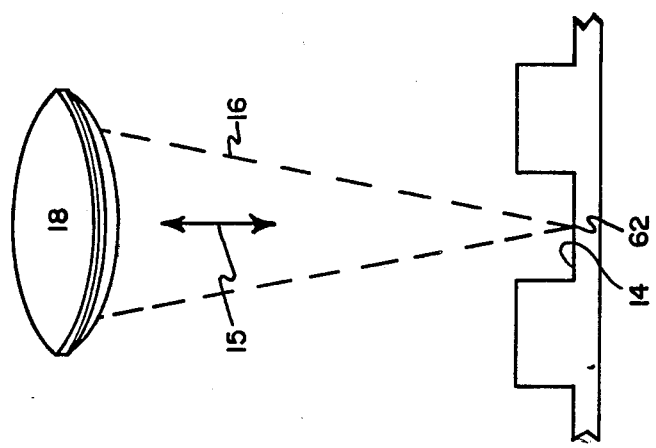
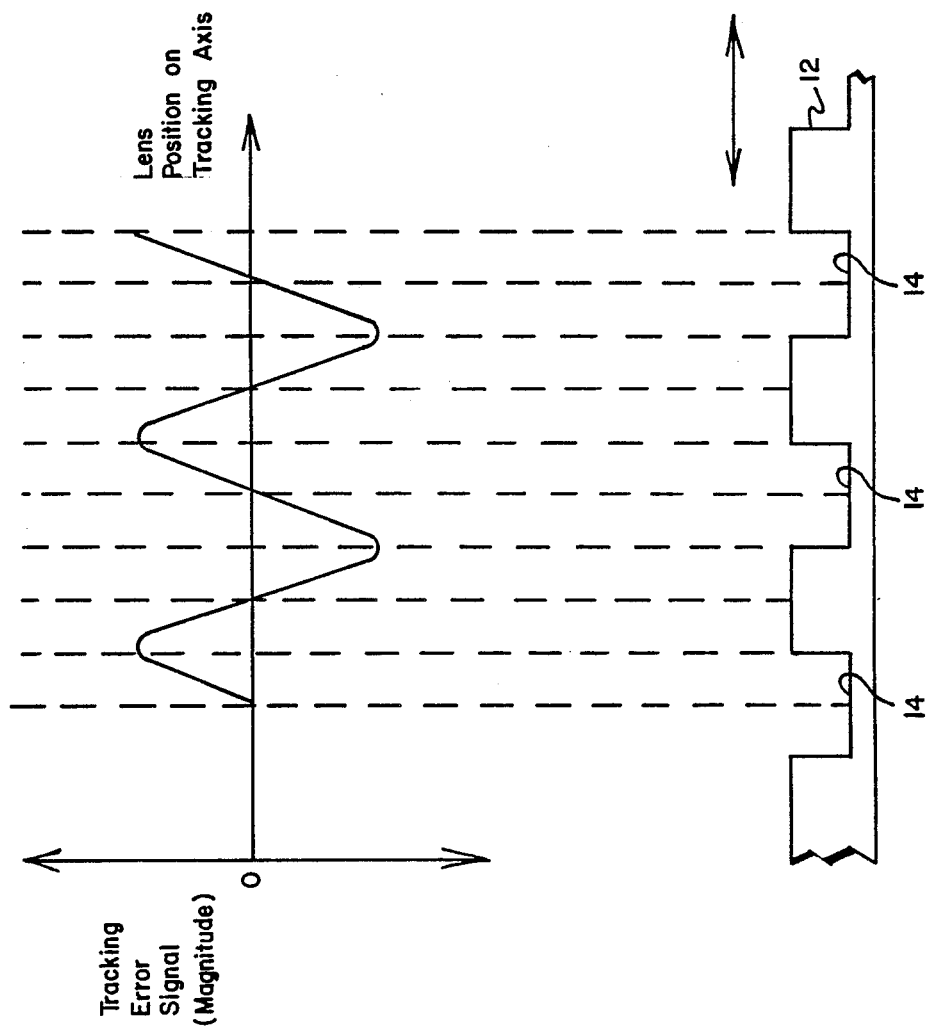

CONCENTRIC PHOTODETECTOR ARRANGEMENT FOR FOCUSING AND TRACKING

BACKGROUND OF THE INVENTION

1. Field of the Invention

This invention is directed to a focusing and tracking detection scheme for use in an optical data storage system.

2. Description of the Prior Art

In a conventional optical data storage system, a beam of radiation is focused onto an information carrying surface by an objective lens. In one embodiment the surface is composed of circular grooves or one continuous spiral on an optical disk. The information carried in the grooves or spiral modulates the beam of radiation and reflects it onto a photodetector. The photodetector produces an electrical signal based upon the amount of radiation impinged thereon. This electrical signal corresponds to the information contained on the optical disk. The electrical signal is then further processed and the information is eventually reproduced in the desired form (i.e. audio, visual, electrical).

In order for the information stored on the optical disk to be reproduced accurately, it is important that the objective lens accurately focus the beam of radiation on the optical disk and that the focused beam of radiation accurately track the circular or spiral grooves. For example, if the information carrying surface moves away from the objective lens, the beam of radiation will be converged at a point slightly in front of the information carrying surface and be out of focus. Conversely, if the information bearing surface moves closer to the objective lens, the beam of radiation will be converged at a point slightly behind the information carrying surface and also be out of focus. Additionally, if the circular or spiral grooves on the information carrying surface move radially with respect to the beam of radiation, a tracking error will result and the beam may not be properly modulated. Therefore, both tracking and focus errors must be detected and the objective lens must be positioned to correct such errors.

Focus and tracking errors have been reduced by placing the objective lens on a servomechanism which is movable with respect to the information carrying surface. The servomechanism is controlled by focus error and tracking error devices. These devices are made up of several photodetectors which detect radiation reflected from the information carrying surface. The amount of radiation on each photodetector is converted to an electrical signal which is combined with electrical signals from the other photodetectors. Combinations of these various signals provide focus error and tracking error signals which control the servomechanism. Typically, the focus and tracking error devices consist of a quadriture detector of the type disclosed in the Stewart U.S. Pat. No. 4,065,786.

Prior systems have sometimes used several different detector devices, one to detect focus errors and the other to detect tracking errors. For example, the Elliott et al U.S. Pat. No 4,152,586 discloses a concentric detector. However, the detector in Elliott et al is only capable of detecting focus errors and an additional detector is needed to detect tracking errors.

In prior inventions where there has been a combination of these detectors, the focus error signal and tracking error signal have been detected from the same radiation beam. In all the instances utilizing this type of detector, however, some additional special optical element has always been needed for redirecting or blocking a portion of the radiation beam. This brings a complexity which makes alignment of the system more difficult and in some instances, for instance in astigmatic focusing, results in high crosstalk between tracking and focus error signals.

SUMMARY OF THE INVENTION

The present invention is a tracking and focusing detector for providing signals as a function of tracking and focus errors of an objective lens with respect to information tracks on an information carrying surface. The detector can be utilized directly in an ordinarily focused beam without any beam preprocessing. This brings a simplicity which promotes easy alignment. Moreover, the detector is relatively insensitive to tilt of the infomation carrying surface and to track rotation. For this reason, the detector is particularly well suited for use in an optical data storage system or in an optical head used in such a storage system.

In one embodiment, the optical data storage system is of the type having an optical disk with information bearing tracks. An objective lens is used to focus a beam of radiation, provided by a laser, onto the information bearing tracks. The radiation is then modulated by the information on the information tracks and collected, thereby producing a signal corresponding to the information stored on the tracks.

The detector is formed by a plurality of sections. The first detector section has a radiation sensitive surface for detecting radiation modulated by the information carrying surface. The first detector section is positioned on a first side of an axis and it is used for providing a first signal representative of the radiation detected on the radiation sensitive surface. With respect to the radiation beam the axis is preferably but not necessarily parallel to the track direction, coded to the beam reflected from the optical disk, and can pass through or near the center of the beam.

The second detector section also has a radiation sensitive surface for detecting radiation modulated by the information carrying surface. It is positioned on a second side of the axis adjacent to and electrically isolated from the first detector section. The second detector section provides a second signal representative of the radiation detected on its radiation sensitive surface. With respect to the radiation beam, the radiation sensitive area of the first and second detector sections capture a central portion of the beam region.

The third detector section has a radiation sensitive surface and is positioned on the first side of the axis about a peripehry of the first detector section. It is used for detecting radiation modulated by the information carrying surface, and for providing a third signal representative of that radiation. The third detector section is also electrically isolated from the first detector section.

The fourth detector section also has a radiation sensitive surface for detecting radiation and provides a fourth signal representative thereof. The fourth detector section is electrically isolated from and positioned about a periphery of the second detector section. With respect to the radiation beam, the radiation sensitive areas of the third and fourth detector sections are positioned to capture a peripheral portion of the beam region.

BRIEF DESCRIPTION OF THE DRAWINGS

FIG. 3A is a representation of the detector of the present invention relative to an objective lens which is focusing a beam of radiation on an information carrying surface.

FIG. 3B is a representation of the detector of the present invention relative to an objective lens which is focusing a beam of radiation at a point beyond the information carrying surface.

FIG. 3C is a representation of the detector of the present invention relative to an objective lens focusing a beam of radiation at a point before the information carrying surface.

FIG. 5A shows an objective lens properly focusing a beam of radiation on an information carrying surface and properly tracking the information carrying surface.

FIG. 5B is a graphic illustration showing the tracking error signal magnitude in volts as a function of the lens position on the tracking axis.

DETAILED DESCRIPTION OF THE PREFERRED EMBODIMENTS

Figure 1:
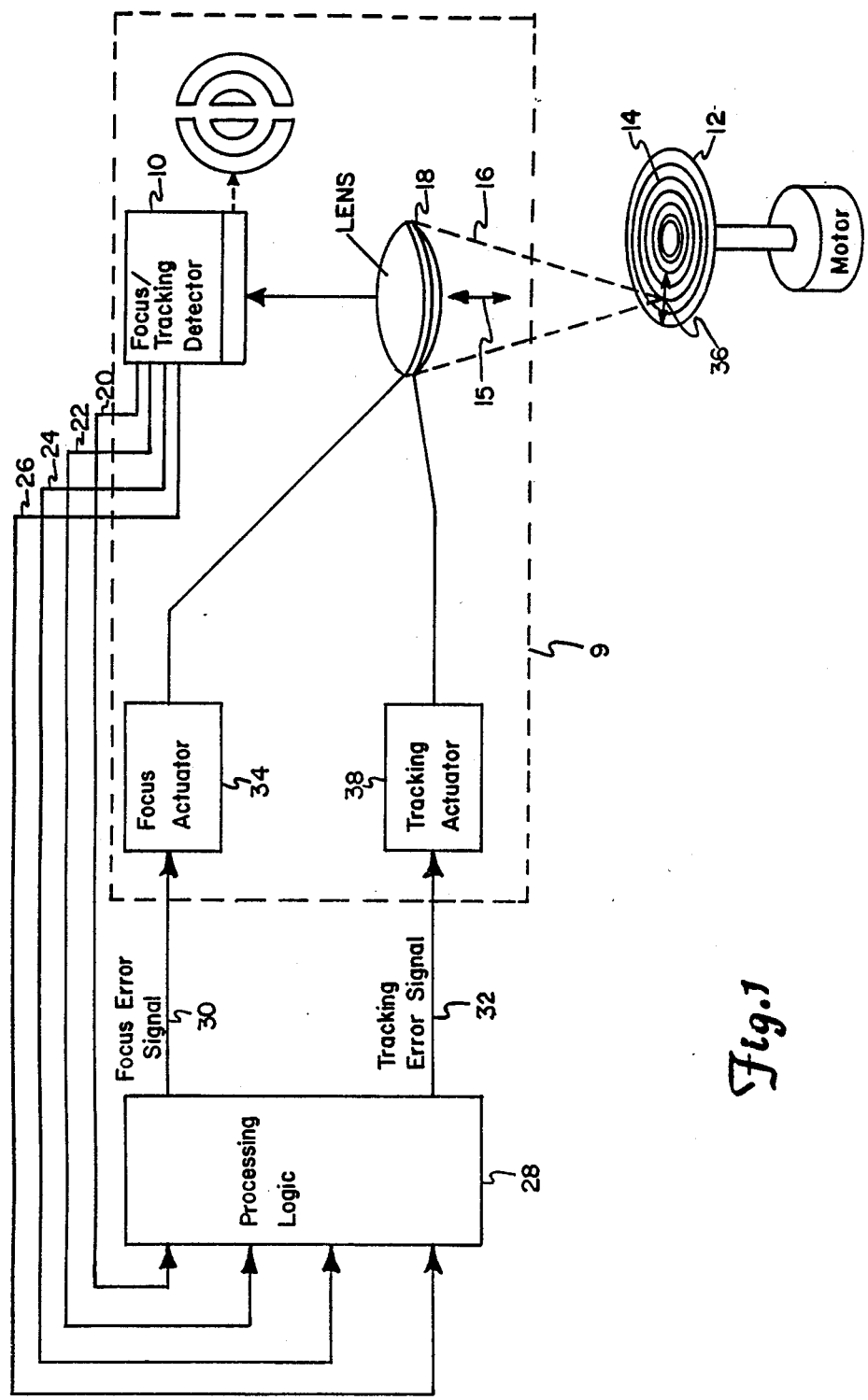
FIG. 1 is a block diagram representation of an optical data storage system utilizing the focus and tracking detector of the present invention.

FIG. 1 shows a focus and tracking detector 10 of the present invention as it relates to other components of an optical data storage system. Additionally, several of the components shown in FIG. 1 can be combined to comprise an optical head 9 used in an optical data storage system. The focus and tracking detector 10, hereinafter referred to as detector 10, detects radiation which is modulated by an information carrying surface which, in this embodiment, is depicted by an optical disk 12 with circular information carrying grooves 14. A beam of radiation 16 which is focused on optical disk 12 by objective lens 18 is emitted by a laser (not shown). After being modulated and reflected from optical disk 12, beam 16 passes through objective lens 18 and possibly through some other optical elements (not shown) and is impinged on detector 10. Detector 10 then emits electrical signals over leads such as 20, 22, 24, and 26 which are received and processed by processing logic 28. The electrical signals are combined by processing logic 28 in such a way that a focus error signal (provided on lead 30) and a tracking error signal (provided on lead 32) are generated. The focus error signal is provided as a function of the vertical position of lens 18 with respect to optical disk 12, and is applied to focus actuator 34. Focus actuator 34 moves lens 18 along a vertical focus axis 15, with respect to optical disk 12, in response to the focus error signal, thereby focusing beam of radiation 16 on circular information carrying grooves 14.

The tracking error signal is provided as a function of the relative position of lens 18 with respect to optical disk 12 along tracking axis 36 which is directed radially with respect to optical disk 12. The tracking error signal is applied to a tracking actuator 38 which moves lens 18 along axis 36 in response to the tracking error signal. Tracking actuator 38 thereby controls lens 18 so that it tracks the circular information carrying grooves 14.

Figure 2:
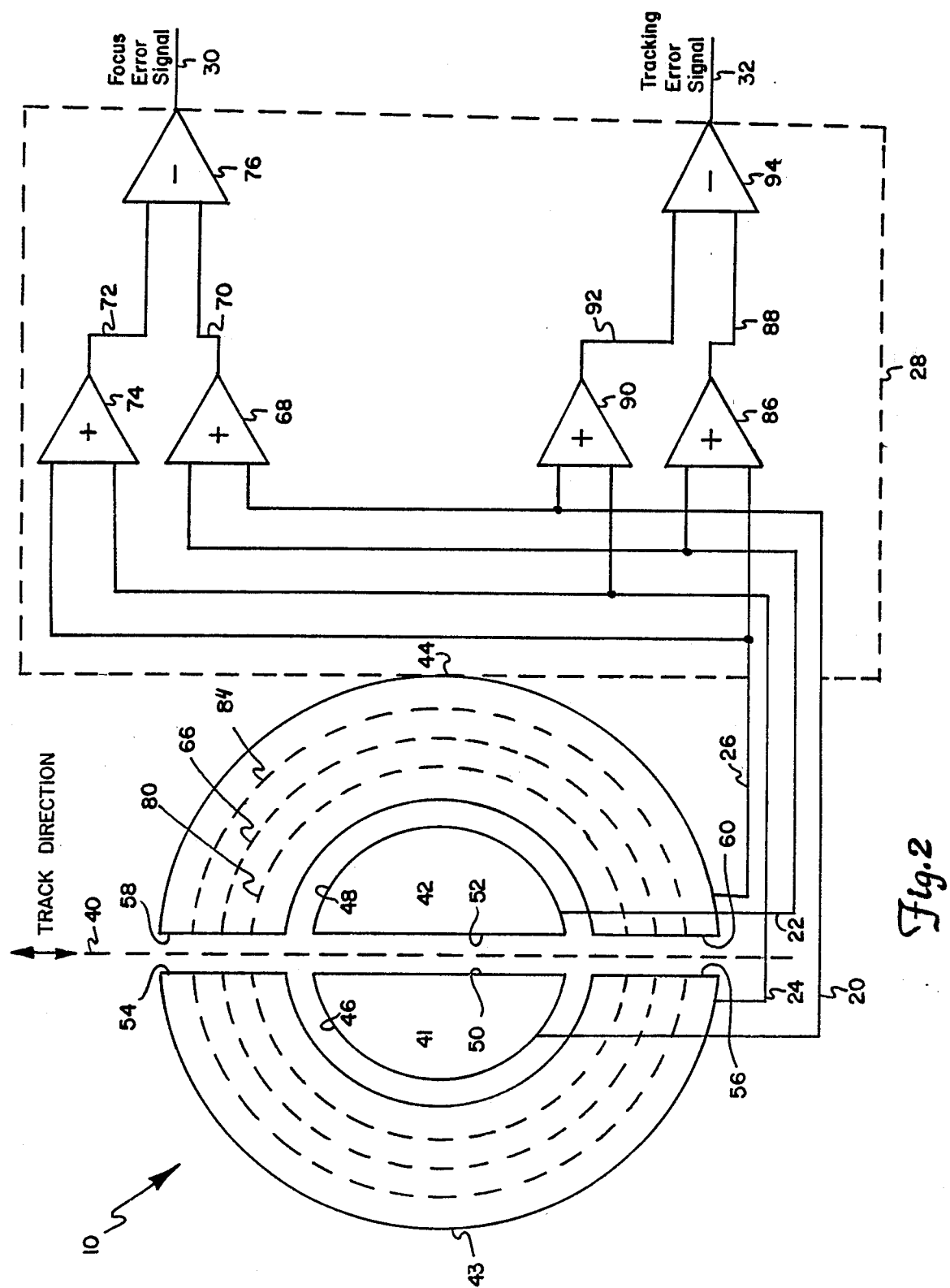
FIG. 2 is a detailed view of the detector showing the radiation sensitive surfaces, and a schematic representation of the processing logic used therewith to produce focus error and tracking error signals.

FIG. 2 is a detailed representation of detector 10 and processing logic 28. The radiation sensitive surfaces of detector 10 provide electrical signals as a function of the intensity of radiation detected thereon. Detector 10 is made up of several sections arranged about an axis 40 which is parallel to the track direction and passes through or at least near the center of beam footprint. Section 41 is positioned on a first (e.g. left) side of axis 40 and provides an electrical signal over lead 20 which is representative of the radiation, from modulated radiation beam 16, detected on the radiation sensitive surface of detector section 41.

Detector section 42 is positioned on a second (e.g. right) side of axis 40 and is adjacent and electrically isolated from detector section 41. Detector section 42 also has a radiation sensitive surface for detecting radiation modulated by optical disk 12. The electrical signal on lead 22, which is representative of the radiation detected on detector section 42, is emitted by detector section 42. In this embodiment, both detector sections 41 and 42 are in the shape of half disks or semicircles, have the same areas, and are mirror images of each other.

Detector section 43 is positioned on the first side of axis 40. Detector section 43 provides the electrical signal on lead 24 which is representative of the modulated radiation detected on its radiation sensitive surface. Detector section 43 is electrically isolated from detector sections 41 and 42. In the illustrated embodiment, detector section 43 is crescent-shaped and circumferentially arranged around an outer periphery 46 of detector section 41.

Detector section 44 is positioned on the second side of axis 40 and is electrically isolated from detector sections 41, 42, and 43. Detector section 44 provides the electrical signal on lead 26 which is representative of the modulated radiation detected on the radiation sensitive surface of detector section 44. In this embodiment, detector section 44 is crescent-shaped and circumferentially arranged around an outer periphery 48 of detector section 42. In this embodiment, detector sections 43 and 44 have the same area and are mirror images of one another. Notice that the shapes of the detector sections described in this preferred embodiment are not intended to limit the scope of the present invention. It is essential, however, that detector sections 41 and 42 are located closer to the radiation beam center than detector sections 43 and 44, respectively. One gains a higher focus error sensitivity if detector sections 43 and 44 are not fully covered by the radiation beam.

The embodiment shown in FIG. 2 illustrates that inner edge 50 of detector section 41, inner edge 52 of detector section 42, end sections 54 and 56 of detector section 43, and end sections 58 and 60 of detector section 44 are colinear and parallel to axis 40.

FIG. 3A shows a situation where radiation beam 16 is correctly focused on optical disk 12 at focal point 62. As depicted, reflected radiation beam 16 which passes through an optical system, which can consist of objective lens 18 only, is imaged at a point 64 in front of detector 10. It must be noted that radiation beam 16 could also be imaged at a point beyond detector 10 without diminishing the effectiveness of this invention; however, in this preferred embodiment, beam 16 is imaged at point 64 in front of detector 10. Beam 16 being thus imaged at point 64, it is impinged upon an area 66 of detector 10. Area 66 is perhaps better illustrated in FIG. 2. The sizes of detector sections 41, 42, 43, and 44 are chosen such that when beam 16 is properly in focus, and area 66 is impinged on detector 10, the focus error signal is equal to zero.

The focus error signal is derived by additively combining the electrical signals from detector sections 41 and 42. These signals are combined in operational amplifier 68, in this preferred embodiment, to form a first signal sum on lead 70 which is representative of the radiation detected on detector sections 41 and 42. The first signal sum is differentially combined with a second signal sum on lead 72 (i.e. the signal sum on lead 70 may be applied to the positive input of operating amplifer 76 and the signal sum on lead 72 may be applied to the negative input of operating amplifier 76). The second signal sum is derived by additively combining the electrical signals on leads 24 and 26, which are emitted by detector sections 43 and 44. This additive combination is performed by operational amplifier 74. The second signal sum represents the radiation detected on detector sections 43 and 44 and is differentially combined with the first signal sum in operational amplifier 76 to produce the focus error signal on lead 30. Detector sections 41, 42, 43 and 44, then, are sized so that when beam 16 is in focus, the amount of radiation impinged on sections 41 and 42 equals the amount of radiation impinged on sections 43 and 44.

FIG. 3B illustrates a situation where radiation beam 16 is not correctly in focus. Optical disk 12 is located in a position such that focal point 62 appears on an image plane 78 which is beyond optical disk 12. Through reflection of radiation beam 16 from optical disk 12, image point 64 is moved closer to detector 10. For this reason, an area of radiation 80 is impinged on detector 10 and is less than area 66 (as illustrated in FIG. 2). Through creation of smaller area 80, less radiation is detected on detector sections 43 and 44; therefore, the second signal sum (on lead 72) will not equal the first signal sum (on lead 70) and the focus error signal will be positive in the illustrated embodiment.

FIG. 3C also illustrates a situation where beam 16 is not correctly in focus. Optical disk 12 is located in a position such that focal point 62 is focused on an image plane 82 which appears in front of optical disk 12. Through reflection of beam 16, image point 64 is moved further from detector 10. This results in an area of radiation 84, which is larger than area 66, to be impinged on detector 10. Therefore, the radiation detected on detector sections 43 and 44 will be greater than the radiation detected on detector sections 41 and 42 of detector 10 and, again, a focus error signal will exist.

Figure 4:
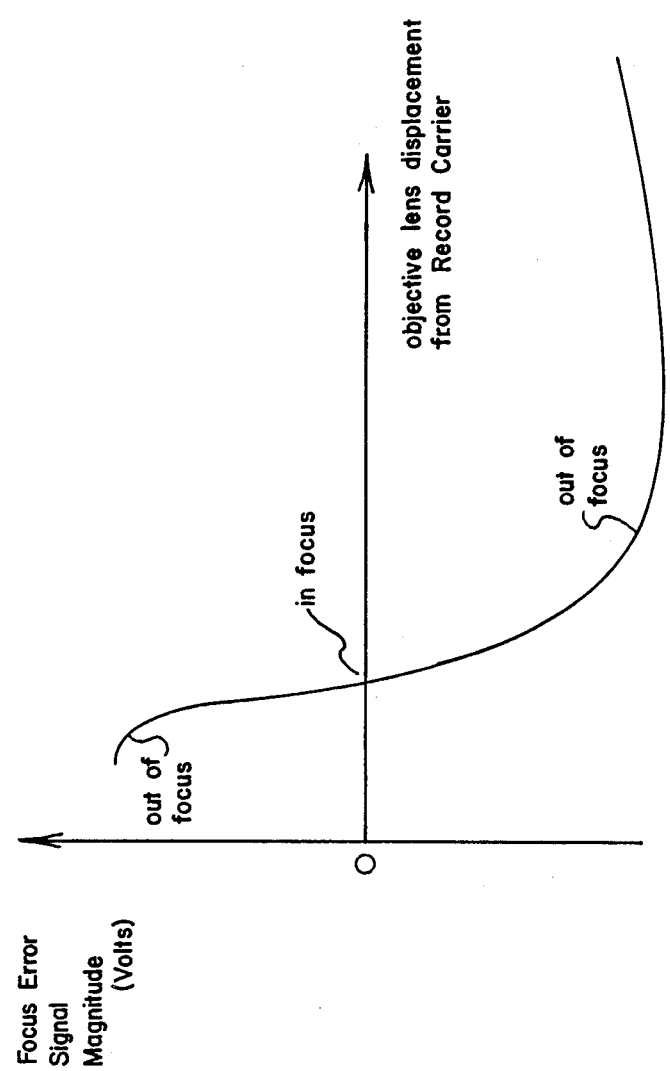
FIG. 4 is a graphic illustration of the focus error signal magnitude in volts as a function of objective lens displacement from the record carrier.

FIG. 4 graphically illustrates the relationship between the magnitude of the focus error signal and the displacement of objective lens 18 from optical disk 12. As shown, the magnitude and polarity of the focus error signal increases as the distance of objective lens 18 increases from the point at which beam 16 is properly focused.

FIG. 5A shows the proper position of focal point 62 on optical disk 12 and circular information carrying groove 14 when radiation beam 16 is properly focused and objective lens 18 is properly tracking information carrying groove 14.

When beam 16 is in the position illustrated in FIG. 5A, light intensity distribution of reflected beam 16 on detector 10 is symmetrical with respect to axis 40. When this occurs, the amount of radiation detected on the first side of axis 40, by detector sections 41 and 43, equals the radiation detected on the second side of axis 40, by detector sections 42 and 44. As shown in FIG. 2, the electrical signals on leads 20 and 24 emitted by detector sections 41 and 43, respectively, are summed in operational amplifier 86 to form a third signal sum on lead 88. Also, the electrical signals on leads 22 and 26, which are emitted by detector sections 42 and 44, respectively, are combined in operational amplifier 90 to form a fourth signal sum on lead 92. When objective lens 18 is properly tracking information carrying groove 14, the third signal sum is equal to the fourth signal sum and the tracking error signal is equal to zero, hence, no tracking error exists. However, when focal point 62 of radiation beam 16 moves closer to one side of information carrying groove 14 than the other, the light intensity distribution of reflected beam 16 on detector 10 becomes asymmetrical with respect to axis 40. The result is that the detector sections 41 and 43 on the first side of axis 40 will not detect the same amount of radiation as the detector sections 42 and 44 on the second side of axis 40; therefore, the third signal sum and the fourth signal sum will not be equal. For this reason, when the third and fourth signal sums are differentially combined in operational amplifier 94, a tracking error signal on lead 32 will result.

FIG. 5B shows an enlarged view of optical disk 12 and circular information carrying grooves 14. Also shown in FIG. 5B is a graphic illustration of the tracking error signal with respect to the lens position on the tracking axis 36. As shown, the further the lens 18 is displaced from the proper tracking position along axis 36, the greater the magnitude of the tracking error signal.

As shown previously in FIG. 1, once the focus error signal and tracking error signal are derived from the processing logic 28 and detector 10, they are fed to the focus actuator 34 and tracking actuator 38, respectively. The actuators 34 and 38 alter the position of the objective lens 18 in response to the focus error signal and tracking error signal.

Because of the structure of the device, no special preprocessing of the reflected beam is needed for getting the focus error signal (one can use an ordinarily focused beam). Alignment of the detector is also easy. Additionally, the detector is relatively insensitive to tilt which may be experienced in the optical disk and to track rotation.

Although the present invention has been described with reference to preferred embodiments, workers skilled in the art will recognize that changes may be made in form and detail without departing from the spirit and scope of the invention.

What is claimed is:

1. For use in conjunction with an optical data storage system of the type having an optical disk with information bearing tracks, laser means for providing a beam of radiation, and an objective lens for focusing the beam of radiation onto the information bearing tracks, a tracking and focusing detector for providing signals as a function of tracking and focus errors of the objective lens with respect to the information tracks on the optical disk, including:

a first detector section positioned on a first side of an axis and having a radiation sensitive surface for detecting radiation modulated by the information carrying surface, and for providing a first signal representative thereof;

a second detector section having a radiation sensitive surface positioned on a second side of the axis adjacent and electrically isolated from the first detector section, for detecting radiation modulated by the information carrying surface and for providing a second signal representative thereof, the radiation sensitive surfaces of the first and second detector sections capturing central portions of the radiation beam;

a third detector section having a radiation sensitive surface positioned on the first side of the axis about a periphery of and electrically isolated from the first detector section, for detecting radiation modulated by the information carrying surface and for providing a third signal representative thereof;

a fourth detector section having a radiation sensitive surface positioned on the second side of the axis about a periphery of and electrically isolated from the second detector section, for detecting radiation modulated by the information carrying surface and for providing a fourth signal representation thereof, the radiation sensitive surfaces of the third and fourth detector sections capturing peripheral portions of the radiation beam.

2. The tracking and focus error detector of claim 1 wherein the radiation sensitive surface of the first detector section is coplanar with the radiation sensitive surface of the second detector section.

3. The tracking and focus error detector of claim 1 wherein the radiation sensitive surface of the third detector section is coplanar with the radiation sensitive surface of the first detector section.

4. The tracking and focus error detector of claim 1 wherein the radiation sensitive surface of the fourth detector section is coplanar with the radiation sensitive surface of the second detector section.

5. The detector of claim 1 wherein the first and second detector sections are semicircular.

6. The detector of claim 1 wherein the third and fourth detector sections are crescent shaped.

7. The detector of claim 1 and further including:
means for manipulating electrical signals which are emitted by the first, second, third and fourth detector sections and are indicative of radiation detected thereon, for producing a focus error signal and a tracking error signal.

8. The detector of claim 7 wherein the means for manipulating electrical signals include:
means for additively combining the electrical signal emitted by the first detector section with the electrical signal emitted by the second detector section to produce a first signal sum;
means for additively combining the electrical signal emitted by the third detector section with the electrical signal emitted by the fourth detector section to produce a second signal sum;
means for additively combining the electrical signal emitted by the first detector section with the electrical signal emitted by the third detector section to produce a third signal sum;
means for additively combining the electrical signal emitted by the second detector section with the electrical signal emitted by the fourth detector section to produce a fourth signal sum;
means for differentially combining the first signal sum with the second signal sum to produce the focus error signal; and
means for differentially combining the third signal sum with the fourth signal sum to produce the tracking error signal.

9. The detector of claim 1 wherein the first and second detector sections have the same physical dimensions.

10. The detector of claim 1 wherein the third and fourth detector sections have the same physical dimensions.

11. An optical head for use in an optical data storage system of the type having an optical disk with servo tracks for storing information, including:
laser means for producing a beam of radiation to be focused on the optical disk;
objective lens means for focusing the beam of radiation on the optical disk and for collecting modulated radiation from the optical disk;
tracking drive means for driving the objective lens about a tracking axis in response to tracking drive signals;
focus drive means for driving the objective lens about a focus axis in response to focus drive signals; and
focus and tracking detector means for providing signals representative of focus and tracking errors of the objective lens with respect to the optical disk, including:
a first photodetector defined by an inner edge and an outer periphery;
a second photodetector defined by an inner edge, which faces the inner edge of the first photodetector, and by an outer periphery, the second photodetector being electrically isolated from the first photodetector;
a third photodetector disposed about the outer periphery of the first photodetector and electrically isolated from the first and second photodetectors; and
a fourth photodetector disposed about the outer periphery of the second photodetector and electrically isolated from the first, second and third photodetectors.

12. The optical head of claim 11 and further including:
means for manipulating electrical signals which are emitted by the first, second, third and fourth photodetectors and are indicative of radiation detected thereon, for producing a focus error signal and a tracking error signal.

13. The means for manipulating electrical signals of claim 12 and further including:
means for additively combining the electrical signal emitted by the first photodetector with the electrical signal emitted by the second photodetector to produce a first signal sum;
means for additively combining the electrical signal emitted by the third photodetector with the electrical signal emitted by the fourth photodetector to produce a second signal sum;
means for additively combining the electrical signal emitted by the first photodetector with the electrical signal emitted by the third photodetector to produce a third signal sum;
means for additively combining the electrical signal emitted by the second photodetector with the electrical signal emitted by the fourth photodetector to produce a fourth signal sum;

means for differentially combining the first signal sum with the second signal sum to produce the focus error signal; and means for differentially combining the third signal sum with the fourth signal sum to produce the tracking error signal.

14. The optical head of claim 11 wherein the first, second, third and fourth photodetectors are coplanar.

15. The optical head of claim 11 wherein the first and second photodetectors are semicircular.

16. The optical head of claim 11 wherein the third and fourth photodetectors are crescent shaped.

17. The optical head of claim 11 wherein the first and second photodetectors have the same physical dimensions.

18. The optical head of claim 11 wherein the third and fourth photodetectors have the same physical dimensions.

19. The optical head of claim 11 wherein the first photodetector is located on a first side of an axis.

20. The optical head of claim 19 wherein the third photodetector is located on the first side of the axis.

21. The optical head of claim 19 wherein the second photodetector is located on a second side of the axis.

22. The optical head of claim 21 wherein the fourth photodetector is located on the second side of the axis.

23. An optical data storage system, including:
an optical disk;
laser means for producing a beam of radiation to be focused on the optical disk;
objective lens means for focusing a beam of radiation on the optical disk and for collecting modulated radiation from the optical disk;
tracking drive means for driving the objective lens about a tracking axis in response to tracking error signals;
focus drive means for driving the objective lens about a focus axis in response to focus error signals;
focus and tracking detector means for providing signals representative of focus and tracking errors with respect to the optical disk, including:
a first photodetector defined by an inner edge and an outer periphery and for producing a first detector signal as a function of received radiation;
a second photodetector defined by an inner edge which faces the inner edge of the first photodetector and by an outer periphery, the second photodetector being electrically isolated from the first photodetector and for producing a second detector signal as a function of received radiation;
a third photodetector disposed about the outer periphery of the first photodetector and electrically isolated from the first and second photodetectors and for producing a third detector signal as a function of received radiation;
a fourth photodetector disposed about the outer periphery of the second photodetector and electrically isolated from the first, second and third photodetectors and for producing a fourth detector signal as a function of received radiation; and
processing means connected to receive first, second, third, and fourth detector signals and to provide the focus and tracking error signals as a function of focus and tracking errors which are derived from various combinations of the first, second, third and fourth detector signals.

24. The optical data storage system of claim 23 wherein the first, second, third and fourth photodetectors are coplanar.

25. The optical data storage system of claim 23 wherein the first and second photodetectors are semicircular.

26. The optical data storage system of claim 23 wherein the third and fourth photodetectors are crescent shaped.

27. The optical data storage system of claim 23 wherein the first photodetector is adjacent the second photodetector and electrically isolated from the second photodetector about an axis.

28. The optical data storage system of claim 27 wherein the third photodetector is disposed about a periphery of the first photodetector on a first side of the axis.

29. The optical data storage system of claim 27 wherein the fourth photodetector is disposed about a periphery of the second photodetector on a second side of the axis.

30. The optical data storage system of claim 23 wherein the processing means includes:
means for additively combining the electrical signal emitted by the first photodetector with the electrical signal emitted by the second photodetector to produce a first signal sum;
means for additively combining the electrical signal emitted by the third photodetector with the electrical signal emitted by the fourth photodetector to produce a second signal sum;
means for additively combining the electrical signal emitted by the first photodetector with the electrical signal emitted by the third photodetector to produce a third signal sum;
means for additively combining the electrical signal emitted by the second photodetector with the electrical signal emitted by the fourth photodetector to produce a fourth signal sum;
means for differentially combining the first signal sum with the second signal sum to produce the focus error signal; and
means for differentially combining the third signal sum with the fourth signal sum to produce the tracking error ignal.

* * * * *